United States Patent
Choi

(10) Patent No.: US 10,668,957 B2
(45) Date of Patent: Jun. 2, 2020

(54) SIDE VEHICLE BODY REINFORCING STRUCTURE

(71) Applicants: Hyundai Motor Company, Seoul (KR); Kia Motors Corporation, Seoul (KR)

(72) Inventor: Hong Lim Choi, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 22 days.

(21) Appl. No.: 16/162,792

(22) Filed: Oct. 17, 2018

(65) Prior Publication Data

US 2019/0210659 A1    Jul. 11, 2019

(30) Foreign Application Priority Data

Jan. 8, 2018 (KR) .......................... 10-2018-0002369

(51) Int. Cl.
| | |
|---|---|
| *B62D 25/20* | (2006.01) |
| *B60K 1/04* | (2019.01) |
| *B62D 25/02* | (2006.01) |

(52) U.S. Cl.
CPC ............ *B62D 25/2036* (2013.01); *B60K 1/04* (2013.01); *B62D 25/025* (2013.01); *B60K 2001/0438* (2013.01); *B62D 25/20* (2013.01)

(58) Field of Classification Search
CPC .. B62D 25/2036; B62D 25/025; B62D 25/20; B60K 2001/0438
See application file for complete search history.

(56) References Cited

U.S. PATENT DOCUMENTS

| | | | | |
|---|---|---|---|---|
| RE44,994 E | * | 7/2014 | Rawlinson | B62D 25/2036 180/68.5 |
| 9,272,637 B2 | * | 3/2016 | Han | B62D 25/2036 |
| 2012/0161429 A1 | * | 6/2012 | Rawlinson | B60N 2/012 280/801.1 |
| 2013/0088045 A1 | * | 4/2013 | Charbonneau | B62D 21/157 296/187.12 |
| 2013/0229030 A1 | * | 9/2013 | Yamaguchi | B62D 25/025 296/193.07 |
| 2014/0338997 A1 | * | 11/2014 | Okada | B62D 25/20 180/68.5 |
| 2018/0237075 A1 | * | 8/2018 | Kawabe | B62D 21/157 |
| 2019/0009661 A1 | * | 1/2019 | Okamura | H01M 2/1083 |

* cited by examiner

*Primary Examiner* — Brian L Swenson
(74) *Attorney, Agent, or Firm* — Morgan, Lewis & Bockius LLP

(57) ABSTRACT

A side vehicle body reinforcing structure may include a center floor panel; a side sill respectively combined to both sides of the center floor panel in a width direction of the vehicle body; a seat cross member configured so that a lower end thereof is combined to the center floor panel and both ends thereof in a width direction of the vehicle body are combined to the side sill to cross the center floor panel in a width direction of the vehicle body; a battery case combined to a lower surface of the center floor panel and disposed at an internal to the side sill; and a partition wall panel respectively both side plates of the battery case in a width direction of the vehicle body, wherein a combining bolt sequentially penetrating the seat cross member and the center floor panel is engaged to the partition wall panel.

14 Claims, 9 Drawing Sheets

SIDE VEHICLE BODY REINFORCING STRUCTURE

CROSS-REFERENCE TO RELATED APPLICATION

The present application claims priority to Korean Patent Application No. 10-2018-0002369 filed on Jan. 8, 2018, the entire contents of which is incorporated herein for all purposes by this reference.

BACKGROUND OF THE INVENTION

Field of the Invention

The present invention relates to a side vehicle body reinforcing structure, and more particularly, to a side vehicle body reinforcing structure for a vehicle in which a high-capacity battery is mounted.

Description of Related Art

Generally, in a front vehicle a vehicle body, a front side member extending in a front and rear direction of the vehicle body is respectively disposed at both sides in a width direction of the vehicle body such that structural strength of the front vehicle body is reinforced.

A side sill, which extends in a front and rear direction of the vehicle body and is respectively disposed at both sides in a width direction of the vehicle body, is connected to a rear end portion of the front side member.

Meanwhile, a floor panel forming a bottom surface of the vehicle body may include a front floor panel, a center floor panel, and a rear floor panel from a front of the vehicle in a front and rear direction thereof. Herein, the front floor panel is included at a bottom surface of an engine compartment, the center floor panel is included at a bottom surface of a passenger compartment, and the rear floor panel is included at a bottom surface of a luggage compartment.

An accelerator pedal, a brake pedal, a seat for a passenger, and the like may be mounted at an upper surface of the center floor panel, and an exhaust pipe, a propeller shaft, and the like may be mounted at a lower surface of the center floor panel. Furthermore, the side sill is coupled to the center floor panel at both sides in the width direction of the vehicle body to cope with a side collision of a vehicle.

Meanwhile, a battery case for mounting a high-capacity battery to a lower surface of the center floor panel or the rear floor panel is provided to an electric vehicle, which represents all vehicles moved by electric power including a hybrid electric vehicle. Furthermore, for a vehicle which is configured so that a propeller shaft passes in a front and rear direction of a vehicle such as a vehicle which is configured so that an engine or a drive motor is mounted to a front portion and a rear wheel is a driving wheel, a tunnel having a cross-section in a "U" shape to be upwardly concave is formed at the center floor panel such that the propeller shaft is disposed therein.

However, if a structure for mounting the battery case in which the high-capacity battery is disposed becomes complicated, and a portion that routes a load transferred through the present structure is severed, performance against a collision of the vehicle body, especially that of a side vehicle body, may be deteriorated.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a side vehicle body reinforcing structure having advantages of improving efficiency of transferring a load and bettering performance against a collision of a vehicle body, especially that of a side vehicle body, when a battery case is provided.

The side vehicle body reinforcing structure according to an exemplary embodiment of the present invention may include: a center floor panel forming a bottom surface of a vehicle body; a side sill extending in a front and rear direction of the vehicle body and respectively combined to both sides of the center floor panel in a width direction of the vehicle body; a seat cross member configured so that a lower end portion thereof is combined to the center floor panel and both end portions thereof in a width direction of the vehicle body are combined to the side sill to cross the center floor panel in a width direction of the vehicle body; a battery case combined to a lower surface of the center floor panel and disposed at an internal to the side sill; a combination reinforcement member respectively combined with lower surfaces of both end portions of the center floor panel in a width direction of the vehicle body and disposed at a lower side of the seat cross member; a partition wall panel which is respectively both side plates of the battery case in a width direction of the vehicle body; an extending nut integrally provided to an upper surface of the combination reinforcement member at an upper side of the partition wall panel and extending to a lower surface of the seat cross member; and an internal nut mounted in the partition wall panel.

A combining bolt sequentially penetrating the seat cross member, the extending nut, the center floor panel, the combination reinforcement member, and the internal nut may be engaged to the extending nut and the internal nut.

At least two seat cross members may be disposed in a front and rear direction of the vehicle body, and the combination reinforcement member may extend from one of the at least two seat cross members to the other one of the at least two seat cross members in a front and rear direction of the vehicle body.

The side vehicle body reinforcing structure according to an exemplary embodiment of the present invention may further include a seat cross connecting member configured so that a lower end portion thereof is combined to the center floor panel to connect the two seat cross members in a front and rear direction of the vehicle body.

The seat cross connecting member may be composed of a pair of the seat cross connecting members which are positioned at both sides with respect to a center of a width direction of the vehicle body.

The battery case may include: a case upper panel formed in a wide plate shape to close an upper side thereof; a case lower panel formed in a wide plate shape to close a lower side thereof; and a case side panel extending along edge portions of the case upper panel and the case lower panel between the case upper panel and the case lower panel to close a lateral side thereof.

A battery engaging hole may be bored at the case lower panel and an engaging bolt may be engaged to the case upper panel after penetrating the case lower panel through the battery engaging hole such that the case upper panel, the case lower panel, and the case side panel are coupled.

A combining member, at which a plurality of stud bolts are integrally formed, may be provided to the case side panel, and a portion, which is formed to have a portion corresponding to the case side panel for being coupled with the case side panel in an up and down direction thereof, and a portion, which protrudes for arranging the stud bolt, may be formed at the combining member.

A combining member engaging hole through which the stud bolt passes may be bored at the side sill.

In a state that the battery case, the center floor panel, and the side sill are disposed such that the stud bolt is inserted into the combining member engaging hole, the combining bolt may sequentially penetrate the seat cross member, the extending nut, the center floor panel, the combination reinforcement member, and the internal nut to be engaged with them.

Both side plates of the combining member in a width direction of the vehicle body, the partition wall panels, and the extending nuts may compose partition walls in a width direction of the vehicle body.

A plurality of ribs, which extend in a width direction of the vehicle body to connect both sides of an internal of the partition wall panel in a width direction thereof, may be formed at the partition wall panel, and the internal nut may be fixed to a rib.

The plurality of ribs may extend from a front end portion of the partition wall panel to a rear end portion of the partition wall panel.

The internal nut may be fixed to the uppermost rib among the plurality of ribs.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
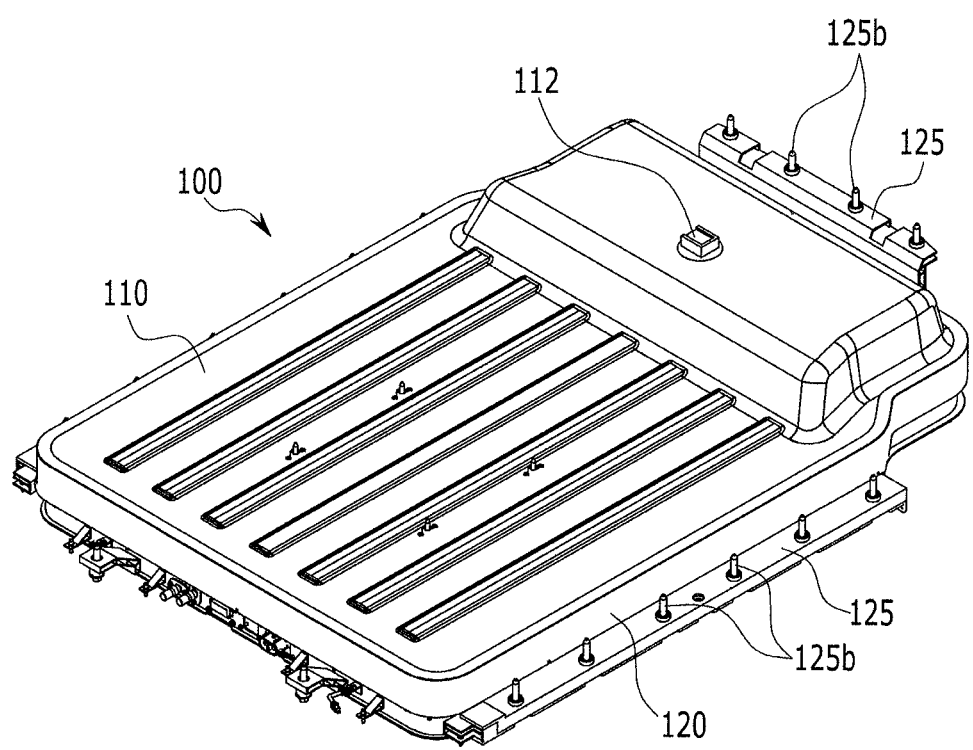
FIG. 1 is a perspective view of a battery case which is connected to a side vehicle body reinforcing structure according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
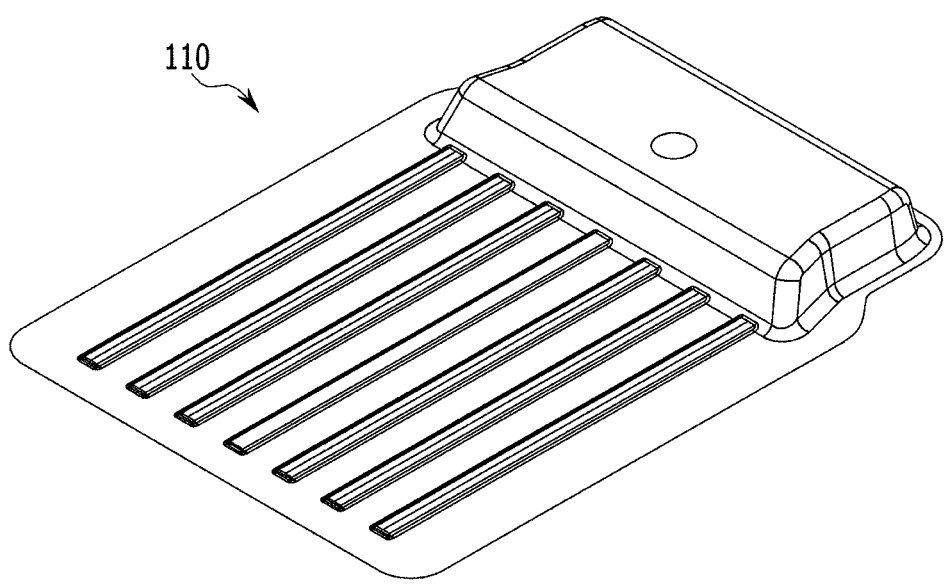
FIG. 2 is a perspective view of an upper panel of a battery case according to an exemplary embodiment of the present invention.
Figure 3:
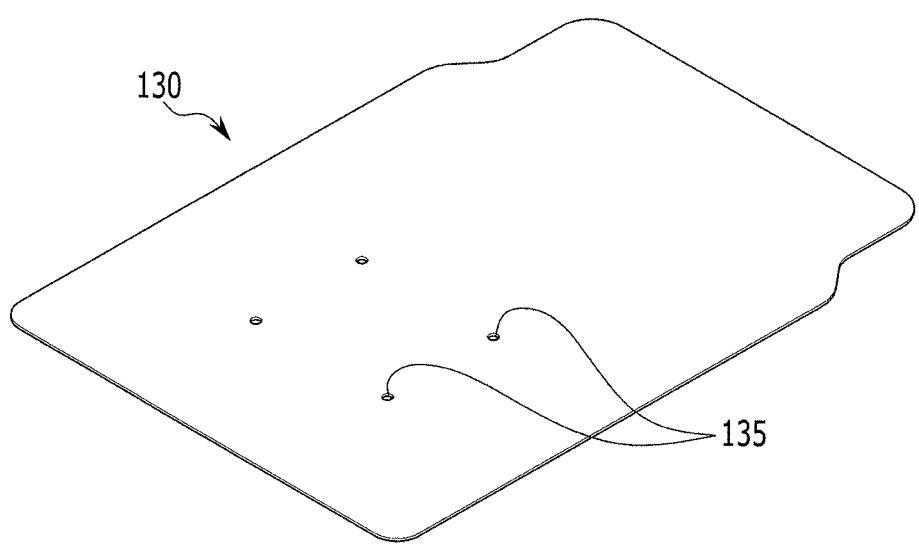
FIG. 3 is a perspective view of a lower panel of a battery case according to an exemplary embodiment of the present invention.
Figure 4:
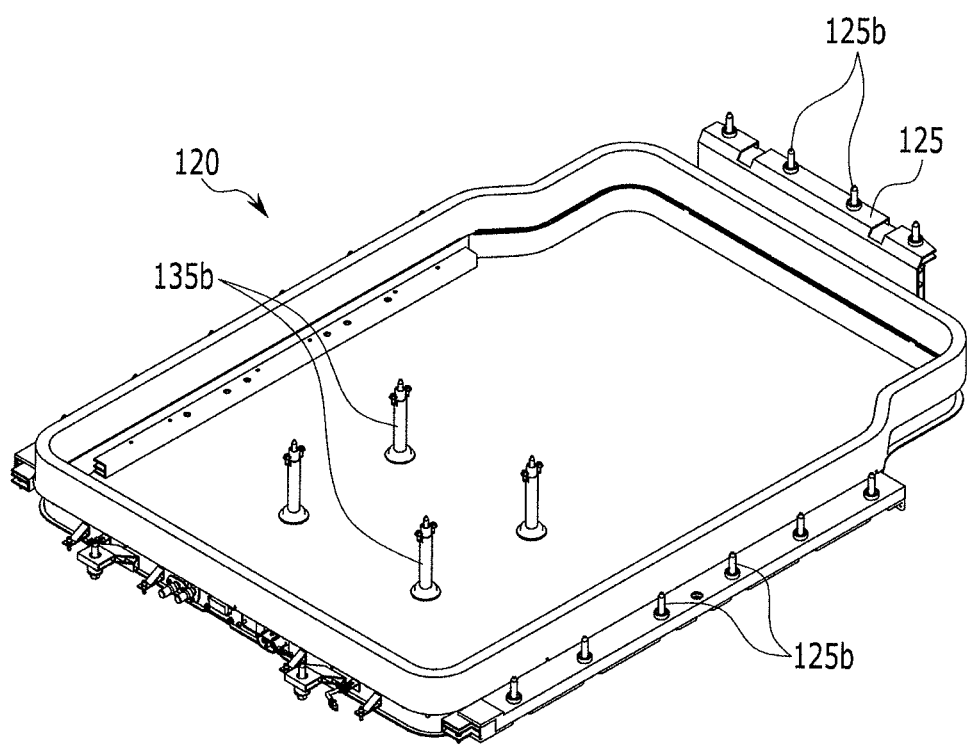
FIG. 4 is a perspective view of a side panel of a battery case according to an exemplary embodiment of the present invention.

FIG. 1 is a perspective view of a battery case which is connected to a side vehicle body reinforcing structure according to an exemplary embodiment of the present invention, FIG. 2 is a perspective view of an upper panel of a battery case according to an exemplary embodiment of the present invention, FIG. 3 is a perspective view of a lower panel of a battery case according to an exemplary embodiment of the present invention, and FIG. 4 is a perspective view of a side panel of a battery case according to an exemplary embodiment of the present invention.

As shown in FIG. 1, FIG. 2, FIG. 3, and FIG. 4, a battery case 100, which is connected to a side vehicle body reinforcing structure 1 according to an exemplary embodiment of the present invention, includes a case upper panel 110, a case lower panel 130, and a case side panel 120. In the exemplary embodiment, directions of upper, lower, front, and rear mean upper, lower, front, and rear directions of an ordinary vehicle, and outside and inside mean relatively outside and inside with respect to a width direction of an ordinary vehicle.

The battery case 100 is applied to an electric vehicle which represents all vehicles moved by electric power including a hybrid electric vehicle. Furthermore, the battery case 100 is provided to the electric vehicle for mounting a high-capacity battery by accommodating the high-capacity battery therein.

The case upper panel 110 is formed in a wide plate shape to close an upper side of the high-capacity battery. Furthermore, an electric power supply 112 is disposed on an upper surface of the case upper panel 110. The electric power supply 112 is configured to transfer electric power of the high-capacity battery to elements such as a drive motor. A high voltage wire, which is crossed in a front and rear direction of a vehicle for connecting the high-capacity battery and the drive motor, is connected to the electric power supply 112. In a vehicle using electric power for driving torque, the high-capacity battery, the drive motor, and the components for supplying electric power are well known to a person of ordinary skill in the art, so detailed descriptions thereof will be omitted.

The case lower panel 130 is formed in a wide plate shape to close a lower side of the high-capacity battery. Furthermore, battery engaging holes 135 for engaging the case upper panel 110, the case lower panel 130, the case side panel 120, and the high-capacity battery are bored in the case lower panel 130.

The case side panel 120 is disposed between the case upper panel 110 and the case lower panel 130. Furthermore, the case side panel 120 extends along edge portions of the case upper panel 110 and the case lower panel 130 and is formed to close a lateral side of the high-capacity battery. Furthermore, as an engaging bolt 135b sequentially penetrates the case lower panel 130, the high-capacity battery, and the case upper panel 110 through the battery engaging hole 135 to be engaged with them, the high-capacity battery is engaged to the battery case 100. Meanwhile, a combining member 125 is provided to the case side panel 120.

At the combining member 125, a plurality of stud bolts 125b are integrally formed. Furthermore, a portion, which is formed to have a portion corresponding to the case side panel 120 for being coupled with the case side panel 120 in an up and down direction thereof, and a portion, which protrudes for arranging the stud bolts 125b, are formed at the combining member 125.

Figure 5:
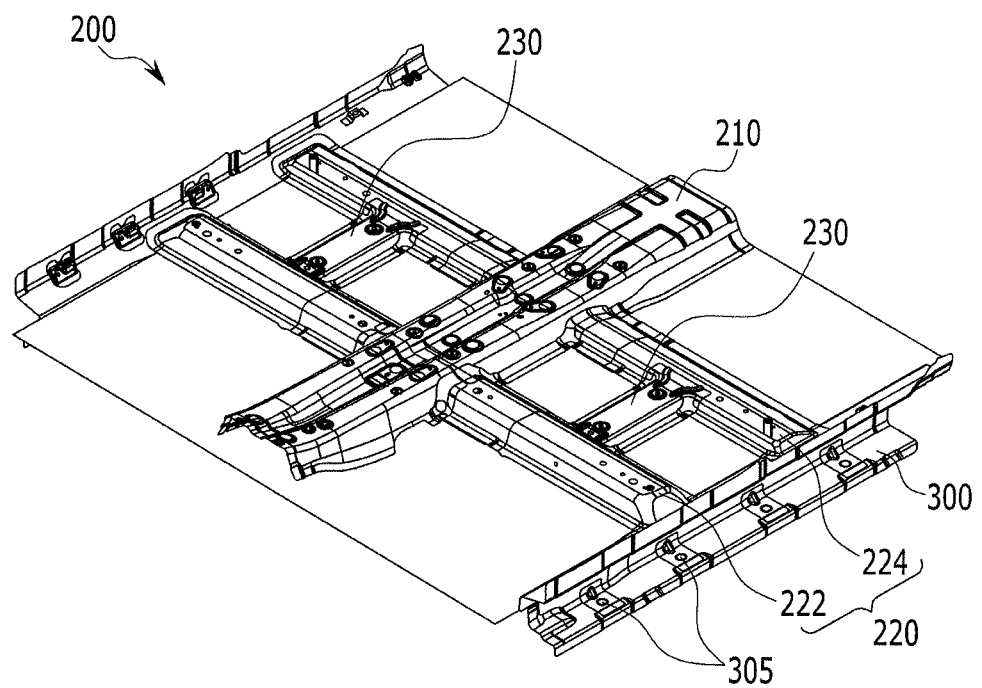
FIG. 5 is a perspective view of combining a center floor panel with a side sill in a side vehicle body reinforcing structure according to an exemplary embodiment of the present invention.

FIG. 5 is a perspective view of combining a center floor panel with a side sill in a side vehicle body reinforcing structure according to an exemplary embodiment of the present invention.

As shown in FIG. 5, a side sill 300 is respectively combined to both sides of a center floor panel 200 which is included at a bottom surface of a passenger compartment in a width direction of the vehicle body. A basic composition of the center floor panel 200 and the side sill 300 is well known to a person of ordinary skill in the art, so a detailed description thereof will be omitted. Meanwhile, a combining member engaging hole 305, through which the stud bolt 125b of the combining member 125 passes, is bored in the side sill 300.

A tunnel 210, formed as a hollow having a "U" shape to be upwardly convex in a center of a width direction of the vehicle body, extends to cross from a front end portion of the center floor panel 200 to a rear end portion of the center floor panel 200, may be formed or disposed at the center floor panel 200. Furthermore, a seat cross member 220 and a seat cross connecting member 230 are disposed on the center floor panel 200.

The seat cross member 220 is disposed to cross the center floor panel 200 in a width direction of the vehicle body. Furthermore, the seat cross member 220 is configured so that a lower end portion thereof is combined to the center floor panel 200 and both end portions in a width direction of the vehicle body are combined to the side sill 300. Furthermore, in a case in which the tunnel 210 is formed or disposed, the seat cross member 220 may be composed as a pair of one which is disposed to connect one end portion of the tunnel 210 in a width direction of the vehicle body with the side sill 300 positioned at one side in a width direction of the vehicle body and another one which is disposed to connect the other end portion of the tunnel 210 in a width direction of the vehicle body with the side sill 300 positioned at the other side in a width direction of the vehicle body. Furthermore, a plurality of seat cross member 220 may be disposed in a front and rear direction of the vehicle body. In FIG. 5, two seat cross members 220, which are disposed in a front and rear direction of the vehicle body, are shown, but it is not limited thereto.

The seat cross connecting member 230 extends in a front and rear direction of the vehicle body to connect two seat cross members 220 disposed in a front and rear direction of the vehicle body. Furthermore, the seat cross connecting member 230 is configured so that a lower end portion thereof is combined to the center floor panel 200. Furthermore, the seat cross connecting member 230 connecting the two seat cross members 220 may be composed as a pair of the seat cross connecting members 230 which are positioned at both sides with respect to a center of a width direction of the vehicle body. For convenience, among the two seat cross members 220, one which is disposed in a relative front will be called "front cross member 222" and the other one which is disposed in a relative rear will be called "rear cross member 224".

Figure 6:
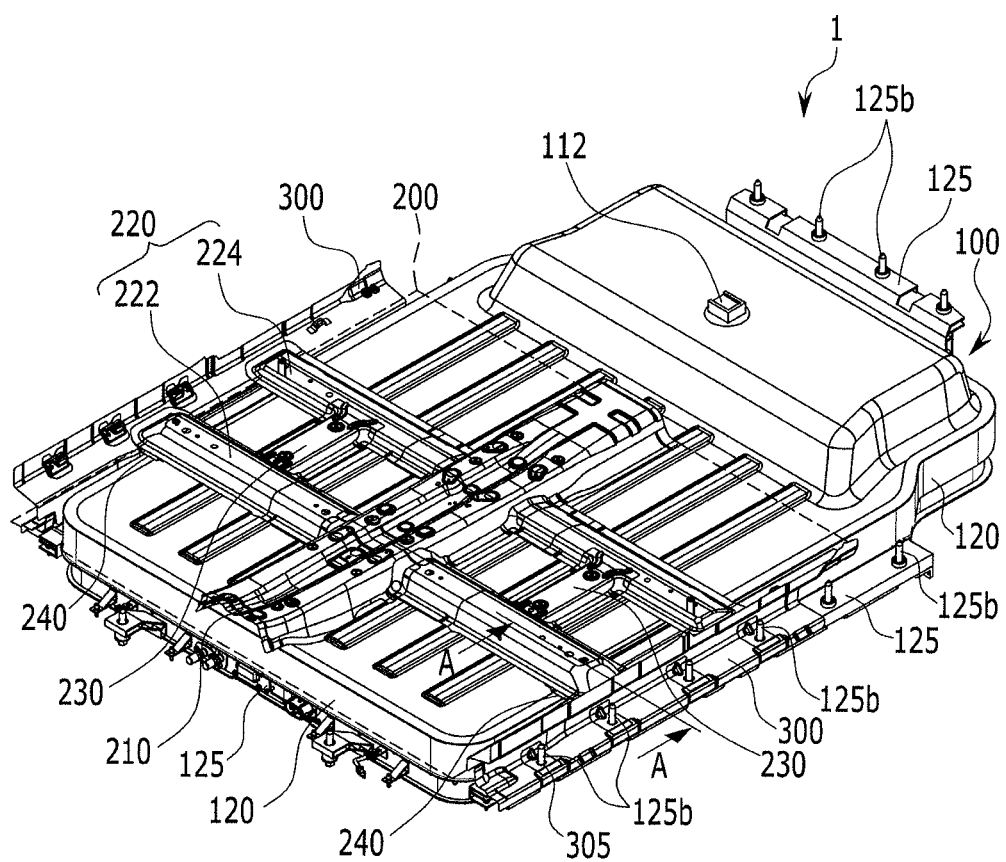
FIG. 6 is a perspective view of a side vehicle body reinforcing structure according to an exemplary embodiment of the present invention.
Figure 7:
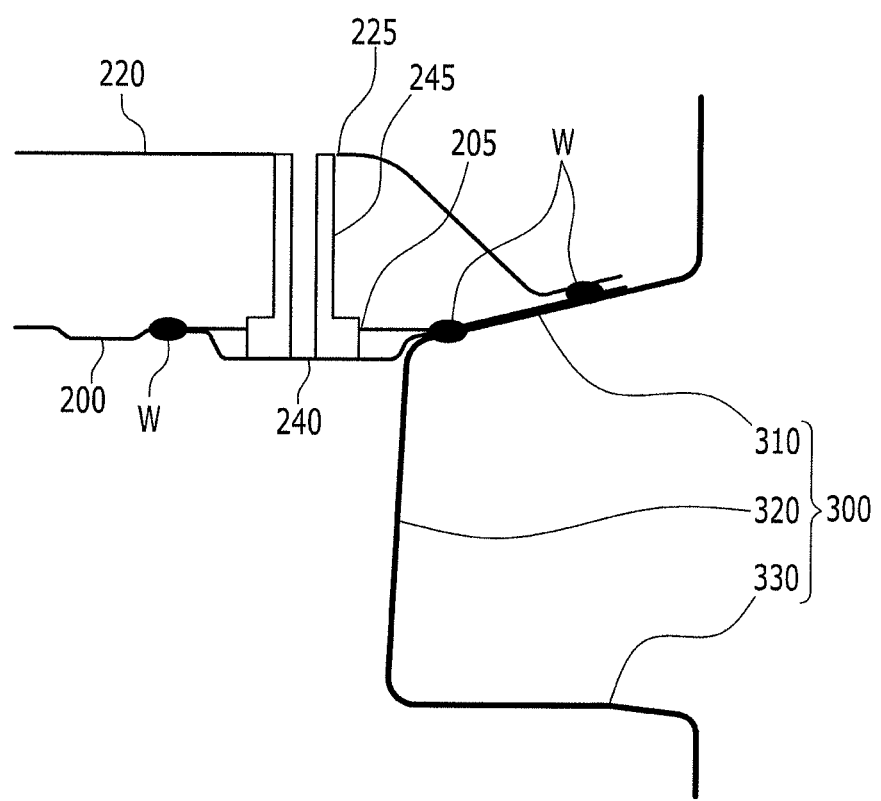
FIG. 7 is a cross-sectional view taken along a line A-A in FIG. 6.
Figure 8:
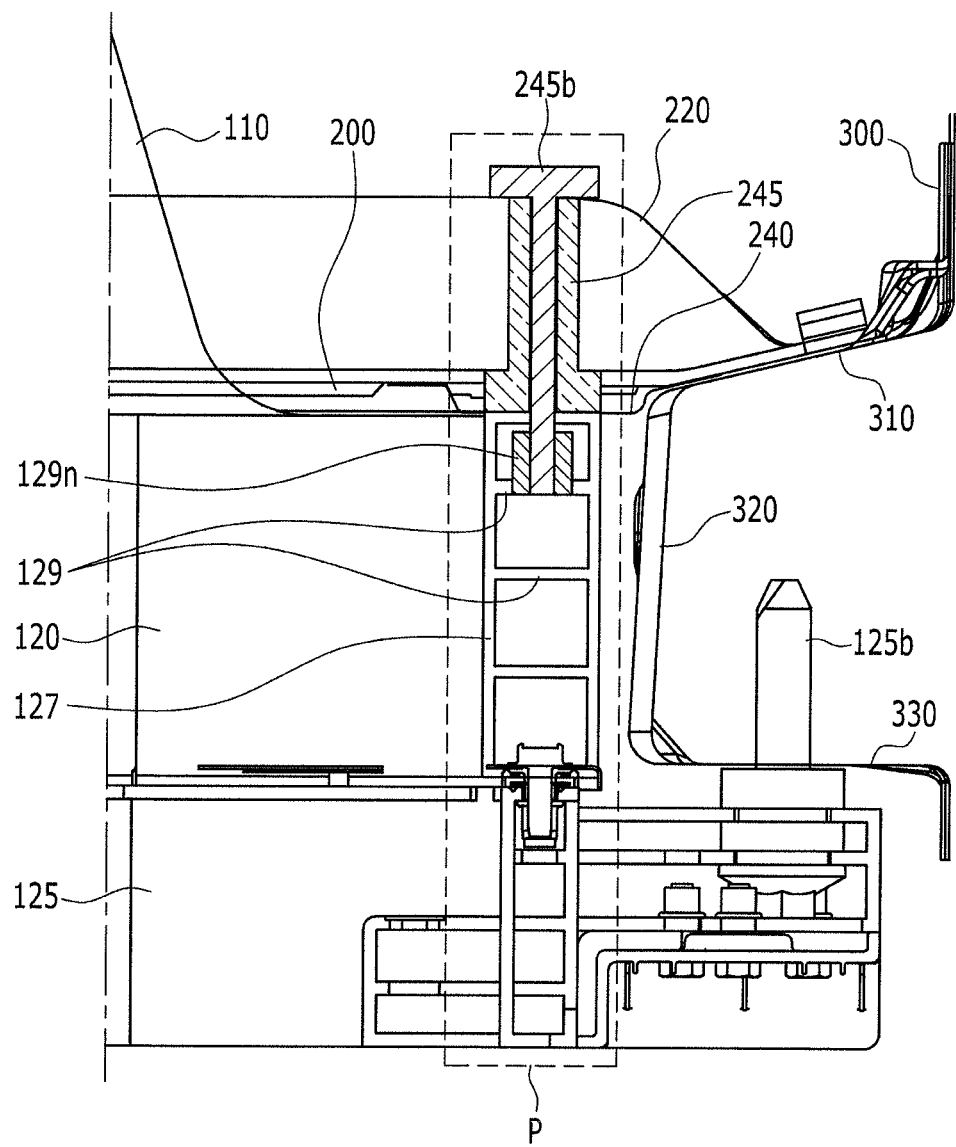
FIG. 8 is a drawing shown along the line A-A in FIG. 6.
Figure 9:
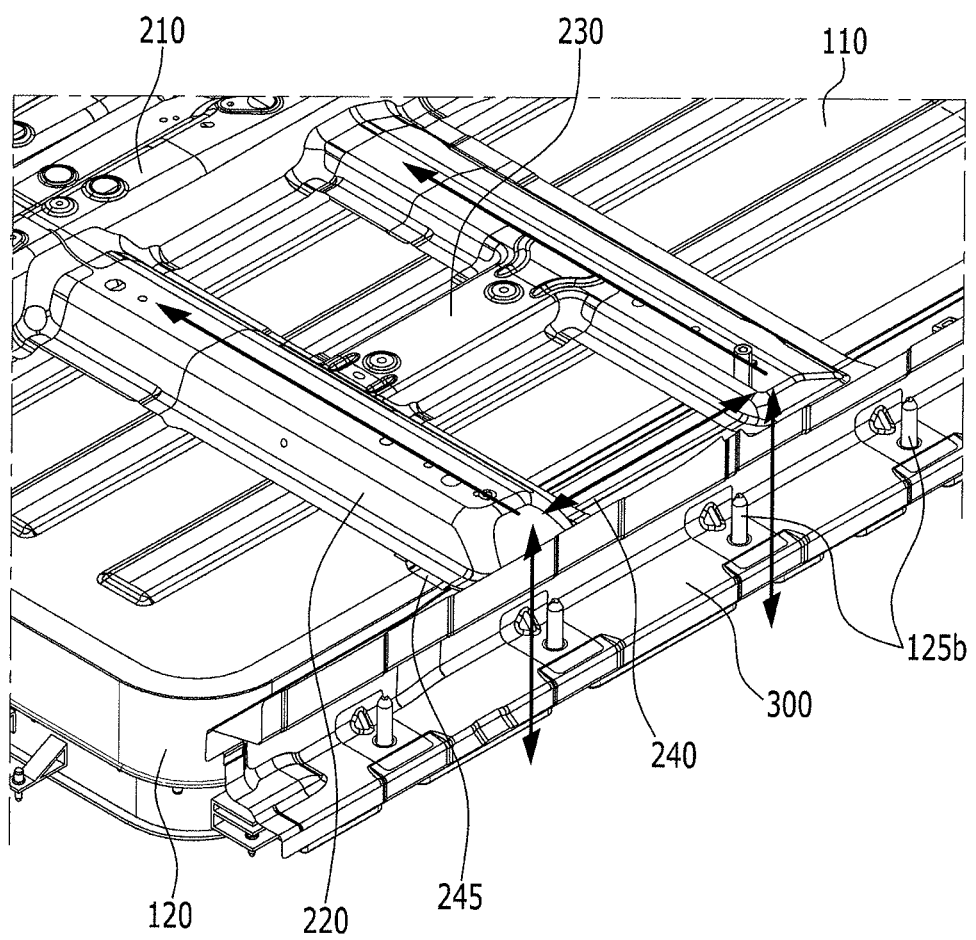
FIG. 9 is a drawing for showing transferring a load depending on a side vehicle body reinforcing structure according to an exemplary embodiment of the present invention.

FIG. 6 is a perspective view of a side vehicle body reinforcing structure according to an exemplary embodiment of the present invention, FIG. 7 is a cross-sectional view taken along a line A-A in FIG. 6, FIG. 8 is a drawing shown from a line A-A in FIG. 6, and FIG. 9 is a drawing for showing transferring a load depending on a side vehicle body reinforcing structure according to an exemplary embodiment of the present invention.

As shown in FIG. 6, FIG. 7, and FIG. 8, a side vehicle body reinforcing structure 1 according to an exemplary embodiment of the present invention is configured so that the center floor panel 200 is combined with an upper side of the battery case 100, and by the present combination, the side sills 300 are disposed at both sides of the battery case 100 in a width direction of the vehicle body, and the side vehicle body reinforcing structure 1 further includes a combination reinforcement member 240 and an internal nut 129n.

The combination reinforcement member 240 is respectively combined with lower surfaces of both end portions of the center floor panel 200 in a width direction of the vehicle body and is disposed to connect the front cross member 222 and the rear cross member 224. That is, the combination reinforcement member 240 extends from the front cross member 222 to the rear cross member 224 in a front and rear direction of the vehicle body.

The side sill 300 is composed to form a cross-section having a box shape by coupling an internal panel which is disposed at a relative inside in a width direction of the vehicle body and an external panel which is disposed at a relative outside in a width direction of the vehicle body. In FIG. 5, FIG. 6, FIG. 7, and FIG. 8, only the internal panel of the side sill 300 is shown, but the composition of the side sill 300 is well known to a person of ordinary skill in the art. Furthermore, the side sill 300 includes a side sill upper plate 310 which is an upper plate of the box shape, a side sill internal plate 320 which is an internal plate of the box shape, and a side sill lower plate 330 which is a lower plate of the box shape to form the box shape. The side sill upper plate 310 and the side sill lower plate 330 are formed at the internal panel and the external panel of the side sill 300, and the side sill internal plate 320 is formed at the internal panel of the side sill 300. In FIG. 7, welding points W where welding a lower surface of the center floor panel 200, the combination reinforcement member 240, and the side sill upper plate 310 is performed, and a welding point W where welding the side sill upper plate 310 with an external end portion of the seat cross member 220 is performed, are shown. The combining member engaging hole 305 is formed at the side sill lower plate 330.

An extending nut 245 is integrally provided to an upper surface of the combination reinforcement member 240. Furthermore, the extending nut 245 extends upwardly to contact a lower surface of the seat cross member 220. Furthermore, the extending nut 245 is disposed at upper sides of partition wall panels 127 which are both sides plates of the case side panel 120 in a width direction of the vehicle body. Furthermore, a bolt hole 225 is bored in the seat cross member 220 and a nut hole 205 is formed at the center floor panel 200 such that the extending nut 245 is disposed therein, and a combining bolt 245b which is engaged with the extending nut 245 penetrates therethrough.

The internal nut 129n is mounted in the partition wall panel 127 of the case side panel 120. Furthermore, a plurality of ribs 129, which extend in a width direction of the vehicle body to connect both sides of the internal of the partition wall panel 127 in a width direction thereof, are formed at the partition wall panel 127. In FIG. 8, it is shown that three ribs 129 are formed, but they are not limited thereto. Furthermore, the plurality of ribs 129 may extend from a front end portion of the partition wall panel 127 to a rear end portion of the partition wall panel 127 in a front and rear direction of the vehicle body. The internal nut 129n is fixed to the rib 129, and it is desirable for it to be fixed to the uppermost rib among the plurality of ribs 129. Meanwhile, in a state of arranging the battery case 100, the center floor panel 200, and the side sill 300 such that the stud bolt 125b is inserted into the combining member engaging hole 305, the combining bolt 245b which is engaged with the extending nut 245b sequentially penetrates the seat cross member 220, the center floor panel 200, and the combination reinforcement member 240, being engaged to the internal nut 129n. Thus, the battery case 100, the center floor panel 200, and the side sill 300 are combined.

By the present combination, the extending nut 245, the partition wall panel 127, and both side plates of the combining member 125 in a width direction of the vehicle body form partition wall portions P composing partition walls in a width direction of the vehicle body such that strength in a collision of a side vehicle body is improved. Furthermore, as a load transferred to the side sill 300 in a collision of a side vehicle body is delivered to the case upper panel 110 and the case lower panel 130 through the partition wall portion P via the center floor panel 200, the seat cross member 220, the combination reinforcement member 240, and the like, continuity of transferring a load between structures is ensured. Furthermore, the partition wall portion P is pushed without buckling in a collision of a side vehicle body, preventing a load from being directly delivered to the high-capacity battery. That is, it is prevented to trespass a structure transformed by a collision into an accommodation space of the high-capacity battery. In FIG. 9, in a collision of a side vehicle body, a load transferred to the side sill 300 is delivered in a front and rear direction of the vehicle body through the combination reinforcement member 240, is delivered in a width direction of the vehicle body through the seat cross member 220, and is delivered in an up and down direction of the vehicle body through the partition wall portion P, which is illustrated by arrows. In this regard, it is possible for the combination reinforcement member 240, the seat cross member 220, and the partition wall portion P to exchange a load with each other through the extending nut 245 (referring to FIG. 9).

According to an exemplary embodiment of the present invention, performance against a collision of the vehicle body, especially that of a side vehicle body, may be improved as a structure for mounting the battery case 100 is connected to the vehicle body so that discontinuity of parts through which loads are transferred through the present structure is decreased and continuity is ensured.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side vehicle body reinforcing structure comprising:
   a center floor panel forming a bottom surface of a vehicle body;
   a side sill extending in a longitudinal direction of the vehicle body and combined to first and second sides of the center floor panel in a width direction of the vehicle body;
   a seat cross member, wherein a lower end portion of the seat cross member is combined to the center floor panel and first and second end portions of the seat cross member are combined to the side sill to cross the center floor panel in the width direction of the vehicle body;
   a battery case combined to a lower surface of the center floor panel and disposed internal to the side sill; and
   a partition wall panel which is disposed at first and second side plates of the battery case in the width direction of the vehicle body,
   wherein a combining bolt is configured to sequentially penetrate the seat cross member and the center floor panel and to be engaged to the partition wall panel.

2. The side vehicle body reinforcing structure of claim 1, further including:
   a combination reinforcement member combined with lower surfaces of first and second end portions of the center floor panel in the width direction of the vehicle body and disposed at a lower side of the seat cross member;
   an extending nut integrally provided to an upper surface of the combination reinforcement member at an upper side of the partition wall panel and extending to a lower surface of the seat cross member; and
   an internal nut mounted in the partition wall panel,
   wherein the combining bolt sequentially penetrates the seat cross member, the extending nut, the center floor panel, the combination reinforcement member, and the internal nut to be engaged to the extending nut and the internal nut.

3. The side vehicle body reinforcing structure of claim 2, wherein at least two seat cross members are disposed in the longitudinal direction of the vehicle body, and the combination reinforcement member extends from one of the at least two seat cross members to another one of the at least two seat cross members in the longitudinal direction of the vehicle body.

4. The side vehicle body reinforcing structure of claim 3, further including a seat cross connecting member, wherein a lower end portion of the seat cross connecting member is combined to the center floor panel to connect the at least two seat cross members in the longitudinal direction of the vehicle body.

5. The side vehicle body reinforcing structure of claim 4, wherein the seat cross connecting member includes a pair of seat cross connecting members which are positioned at first and second sides with respect to a center of the width direction of the vehicle body.

6. The side vehicle body reinforcing structure of claim 2, wherein the battery case includes:
a case upper panel formed in a plate shape to close an upper side of the battery case;
a case lower panel formed in a plate shape to close a lower side of the battery case; and
a case side panel extending along edge portions of the case upper panel and the case lower panel between the case upper panel and the case lower panel to close a lateral side of the battery case, and
Wherein the case upper panel, the case lower panel, and the case side panel are coupled each other.

7. The side vehicle body reinforcing structure of claim 6, wherein a battery engaging hole is bored at the case lower panel and an engaging bolt is engaged to the case upper panel after penetrating the case lower panel through the battery engaging hole.

8. The side vehicle body reinforcing structure of claim 6, wherein a combining member, at which a stud bolt is integrally formed, is provided to the case side panel, and
wherein a first portion, which is formed to correspond to the case side panel for being coupled with the case side panel in up and down directions thereof, and a second portion, which is protrudingly formed for arranging the stud bolt; are formed at the combining member.

9. The side vehicle body reinforcing structure of claim 8, wherein a combining member engaging hole through which the stud bolt passes are bored at the side sill.

10. The side vehicle body reinforcing structure of claim 9, wherein, in a state that the battery case, the center floor panel, and the side sill are disposed such that the stud bolt is inserted into the combining member engaging hole, the combining bolt sequentially penetrates the seat cross member, the extending nut, the center floor panel, the combination reinforcement member, and the internal nut to be engaged with each other.

11. The side vehicle body reinforcing structure of claim 8, wherein first and second side plates of the combining member, the partition wall panel, and the extending nut form partition walls in the width direction of the vehicle body.

12. The side vehicle body reinforcing structure of claim 2, wherein a plurality of ribs, which extend in the width direction of the vehicle body to connect first and second sides of an internal of the partition wall panel in a width direction thereof, are formed at the partition wall panel, and the internal nut is fixed to the plurality of ribs.

13. The side vehicle body reinforcing structure of claim 12, wherein the plurality of ribs extends from a first end portion of the partition wall panel to a second end portion of the partition wall panel.

14. The side vehicle body reinforcing structure of claim 12, wherein the internal nut is fixed to an uppermost rib among the plurality of ribs.

* * * * *